July 29, 1941.  M. A. BLU  2,250,744
VELOCIPEDE
Filed June 9, 1937
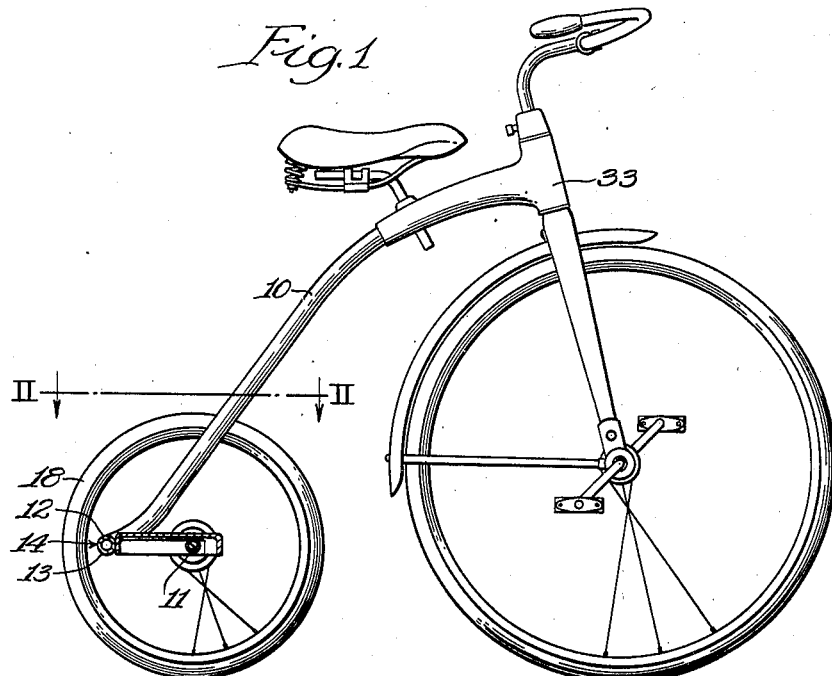
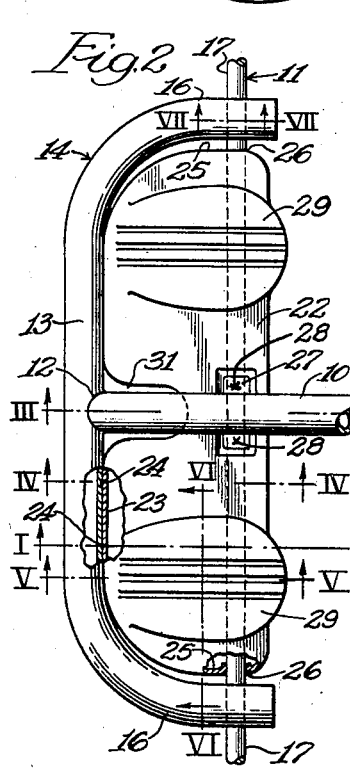
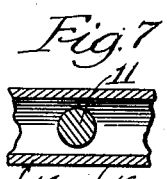
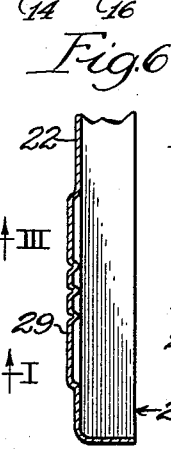
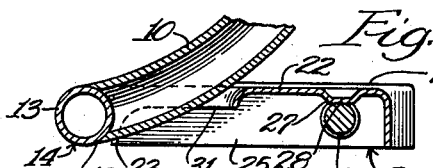
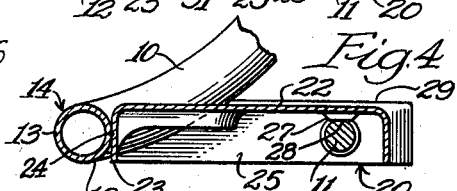
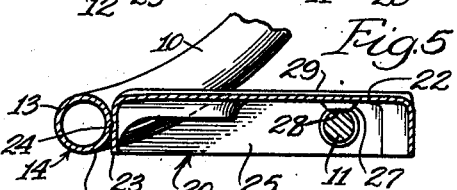
Inventor:
Marshall A. Blu,
By Frank H. Marks,
Attorney.

Patented July 29, 1941

2,250,744

UNITED STATES PATENT OFFICE 2,250,744

VELOCIPEDE

Marshall A. Blu, Chicago, Ill., assignor to Sears, Roebuck and Co., Chicago, Ill., a corporation of New York Application June 9, 1937, Serial No. 147,297

4 Claims. (Cl. 280—291)

This invention relates to velocipedes and is concerned more particularly with extra-passenger equipment therefor.

It is an object of my invention to provide a velocipede with an improved stand for an extra passenger.

It is another object to provide a velocipede adapted to support an extra passenger in such manner as to relieve the rear axle of a substantial part of the resultant stress.

It is a further object to provide a velocipede adapted to support an extra passenger in such manner that the resultant stress is largely taken up by the frame.

Further objects and advantages of the invention will appear as the description proceeds.

An embodiment of my invention is illustrated in the accompanying drawing, in which—

Fig. 1 is a vertical section-elevation, taken as indicated by the line I—I in Fig. 2.

Fig. 2 is an enlarged fragmentary plan view of the foot rest or stand and associated structure, taken as indicated by the line II—II in Fig. 1, a detail being shown in section.

Figs. 3, 4, 5, 6 and 7 are enlarged sectional views taken as indicated by the lines III—III, IV—IV, V—V, VI—VI and VII—VII, respectively, in Fig. 2.

Referring now more particularly to the drawing, the velocipede may be of any suitable design and has a main frame member of generally T-shape, with a stem or backbone 10 extending rearwardly from the steering post and downward centrally over the rear axle 11 and terminating rearwardly at 12 beyond the axle and at the front of the bight 13 of the yoke head 14. The stem may be welded or otherwise suitably united to the head. The yoke is preferably substantially horizontal, and its arms 16 extend forward and are pierced by the end portions 17 of the rear axle inwardly of and preferably adjacent the rear wheels 18.

The stand plate 20 may be of sheet metal or other suitable material which horizontally bridges and substantially fills the space between the yoke bight 13 and the axle 11, and may comprise an inverted pan-like member having depending flange portions and a supporting top 22. The pan and yoke protect the axle from being stepped on. The pan may be of substantially the same vertical depth as the yoke to afford adequate strength without materially increasing air resistance. The rear flange portion 23 of the pan is tack-welded or spot-welded or otherwise suitably united with the inner side of the bight 13 as shown at 24. The side flange portions 25 provide openings 26 adjacent the forward ends thereof through which the axle 11 passes. The top 22 is depressed at 27 over the axle 11 and the depressed portion is tack-welded or spot-welded as at 28 or otherwise suitably secured to the axle. The yoke protects the edge of the pan or stand plate and is preferably of curved transverse contour in order not to injure the rider or catch clothing.

The plate 20 at opposite sides of the stem 10 is formed with preferably roughened foot rest portions 29 projecting slightly in advance of the axle and having their major lengths disposed rearwardly, terminating adjacent the yoke bight 13. The top of the yoke forms in effect a continuation of the plate 20, providing additional area for the support of the extra passenger's feet or luggage.

The rear central part of the stand plate is cut out as at 31 to provide clearance for the rear end of the stem 10. It will be appreciated that the stand plate, rear axle, yoke and stem form a single body supported forwardly at the front end of the stem adjacent the steering post 33 and rearwardly in bearings (not shown) in the hubs of the rear wheels 18. The stand plate and yoke together provide a platform which is supported in cantilever fashion rearwardly from the wheels, so that the center of gravity of the passenger supported thereby will be in a plumb line back of the axle. Thus instead of having the axle bear the entire weight of the passenger as would be the case if the axle were centered under the platform, a large part of the weight is taken up in flexing the stem 10.

The saddle 35 is located forward of the rear axle sufficiently to enable the weight of the pedalist to maintain the equilibrium of the velocipede while the passenger is being carried, the rear axle being largely relieved of the weight of the pedalist by virtue of the platform construction described.

I am aware that many changes may be made and details of construction varied through a wide range without departing from the principles of my invention, and I therefore do not purpose limiting the patent granted hereon otherwise than as necessitated by the prior art.

I claim:

1. A velocipede comprising a rear axle, a platform including a stand plate having depending side flanges through which spaced parts of the axle pass, means uniting an intermediate portion of said plate to an intermediate part of said axle, a backbone, and means including a depending flange on said plate and spaced substantially horizontally rearwardly from said axle for securing said backbone to said platform.

2. A velocipede comprising a rear axle, a stand plate having side flanges through which spaced parts of the axle pass, means uniting an intermediate portion of said plate to an intermediate part of said axle, said plate having a depending rear flange spaced rearwardly from said axle, a protective bar secured to and behind the last mentioned flange, and a backbone secured to said bar.

3. A velocipede comprising a rear axle, a stand plate having side portions through which spaced parts of the axle pass, means uniting an intermediate portion of said plate to an intermediate part of said axle, said plate having a portion spaced rearwardly from said axle, a protective bar secured to and behind the last mentioned portion, and a backbone secured to said bar.

4. A velocipede comprising a substantially horizontal U-shaped yoke having its arms extending forwardly from its bight, said arms having transverse openings through which the rear axle extends, said yoke and axle constituting a closed platform frame, a stand plate united with said bight and axle, a backbone having its rear end united with the front of said bight and extending forwardly through said plate, there being clearance between said backbone and plate to allow for yield of said backbone without interference from said plate.

MARSHALL A. BLU.